United States Patent Office 3,315,351
Patented Apr. 25, 1967

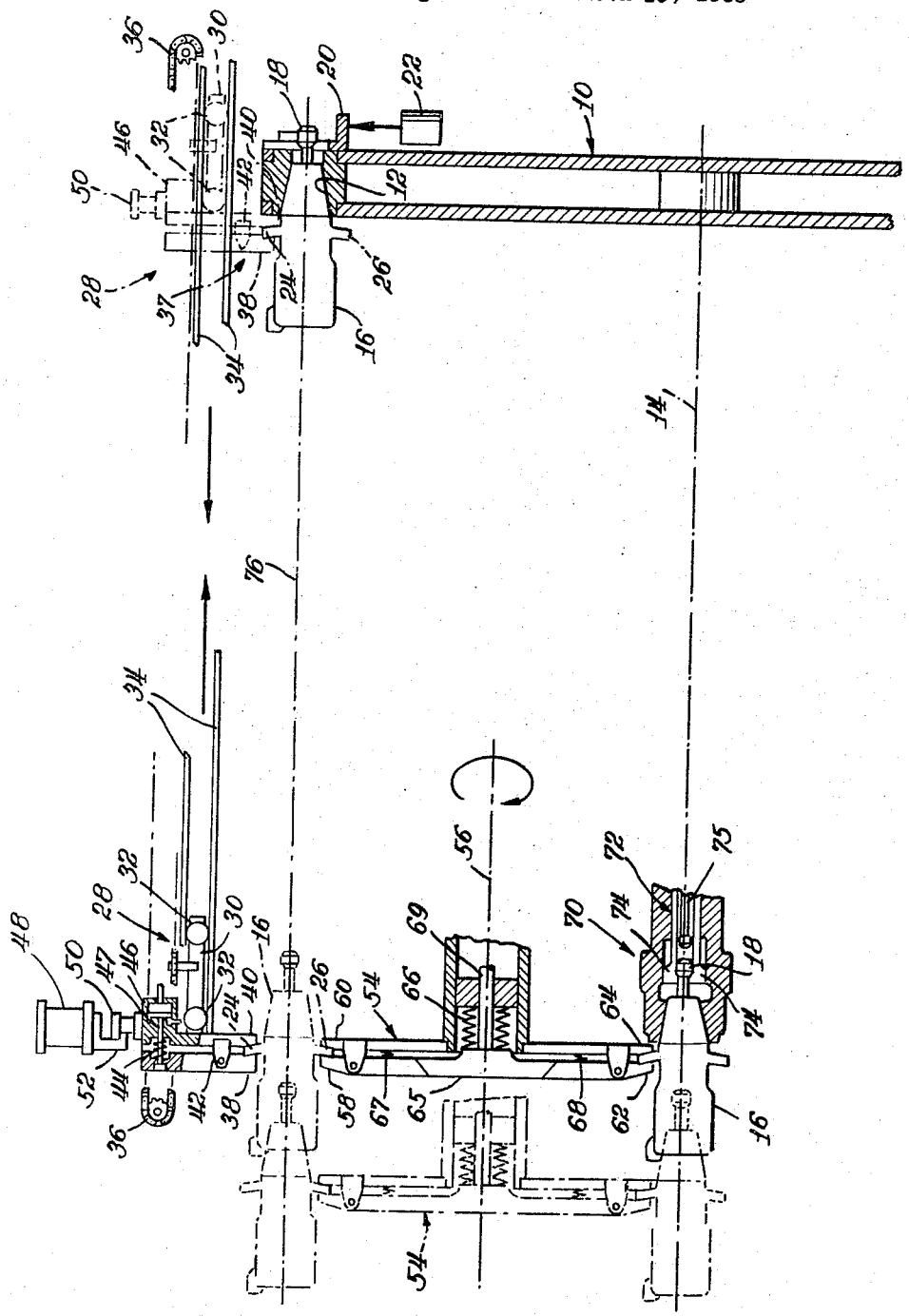

3,315,351
AUTOMATIC TOOL CHANGING APPARATUS
Myron L. Anthony, La Grange, and Barnard R. Better, Chicago, Ill., assignors to Scully-Anthony Corporation, La Grange, Ill., a corporation of Illinois
Continuation of application Ser. No. 500,471, Oct. 11, 1965, which is a continuation of application Ser. No. 265,552, Mar. 15, 1963. This application June 10, 1966, Ser. No. 556,782
4 Claims. (Cl. 29—568)

This application is a continuation of our application Ser. No. 500,471, filed Oct. 11, 1965, now abandoned, which in turn, is a continuation of Ser. No. 265,552, filed Mar. 15, 1963, now abandoned.

The present invention relates to automatic tool changing apparatus adapted to be employed in conjunction with a machine tool to automatically transfer a plurality of tools seriatim from a storage area to a spindle or work station and subsequently back again to the storage area. The apparatus of the invention is especially suited for use in conjunction with data controlled machine tools.

Tool changing systems heretofore developed commonly comprise tool storage means which are located in relatively close proximity to a work station or machine tool spindle. In systems of this type, considerable difficulty has been encountered in attempting to design and position the tool storage member so that it will not interfere with other structure or occupy space needed for other purposes, and yet will be sufficiently large to accommodate the desired number of tools.

A further disadvantage common to most of the tool changing systems in use relates to the manner in which a transfer arm or the like must be moved during a tool changing operation. Most commercial tool changing systems include a transfer arm or exchange member which is adapted to remove an old tool from a machine tool spindle and insert a new tool therein. In substantially all such systems, including that of the present invention, the transfer arm is rotated during the tool exchange operation. However, in most known types of tool changing systems the relatively large and heavy transfer arm assembly is mounted on a slide or on a pivot, or is swivelled in some manner, since it is required to go through various complex motions in order to pick up a newly selected tool and an old tool in the spindle so as to make the exchange. In many such systems, the transfer arm first slides or is pivoted in one direction in order to pick up a newly selected tool, and thereafter it slides or is pivoted in the opposite direction in order to grasp an old tool in the spindle. The mechanism for producing such movement of the heavy transfer arm assembly is complex and quite expensive.

It is an object of the present invention to provide automatic tool changing apparatus wherein the tool storage means may be located quite apart from the work station or machine tool spindle at any desired remote location, and wherein tool transfer means is provided to transfer tools between the storage means and an intermediate tool transfer position located in proximity to the work station.

Another of our objects is to provide a tool changing system of the foregoing type wherein a transfer arm is positioned between the intermediate tool transfer position and the machine tool spindle and is rotatable to an operative position wherein it is adapted to grip at the same time both a newly selected tool being held at the intermediate position by the tool transfer means and an old tool being held in the spindle.

A further object of the invention is to provide a tool changing system as last above-mentioned wherein the transfer arm is rotatably mounted on a fixed axis which is midway between the axis of a tool in the intermediate tool transfer position and the axis of a tool in the machine tool spindle.

An additional object of the present invention is to provide such a tool changing system wherein the transfer arm is adapted to take a newly selected tool from the intermediate tool transfer position and insert it in the spindle while taking an old tool from the spindle and positioning it in the intermediate tool transfer position, and wherein the tool transfer means is adapted to grip the old tool in the intermediate position and return it to the tool storage means.

Still another of our objects is to provide automatic tool changing apparatus wherein a tool storage member is positioned behind an associated machine tool spindle and is adapted to hold a plurality of tools with their axes parallel to the axis of the spindle, and to provide in combination therewith tool transfer means and a transfer arm whereby the tool transfer means is adapted to remove a newly selected tool from the storage means and carry it forwardly in a direction parallel to the spindle axis to an intermediate tool transfer position, and the transfer arm is adapted to grip at the same time both the new tool in the intermediate position and an old tool in the spindle.

In our copending application entitled, Apparatus and Method for Automatic Tool Changing, Ser. No. 178,060, filed Mar. 7, 1962, now abandoned, and assigned to the assignee of the present invention, we have described a tool or tool holder having a generally radial flange means or the like with a plurality of gripping surfaces thereon. There is also described therein gripping means adapted to cooperate with such gripping surfaces by gripping or clamping movement in a direction generally parallel to the axis of the tool, whereby a flanged tool or tool holder may readily be transferred from one gripping member which is in engagement with a first one of the flange gripping surfaces to another gripping member simultaneously engaged on a second one of the flange gripping surfaces.

It is a general object of the present invention to provide automatic tool changing apparatus particularly adapted for use with tools of the type having a generally radial flange means or the like with a plurality of gripping surfaces thereon, which apparatus is adapted to cooperate with such flange means for removing an old tool from a machine tool spindle and transferring a newly selected tool thereto.

Other objects, uses and advantages of the invention will become apparent, or be obvious, from the following specification, particularly when considered in conjunction with the accompanying drawing.

The drawing is a somewhat schematic side elevational view, partly in section and partly broken away, of an automatic tool changing system in accordance with the present invention.

It should be understood that when reference is made herein or in the appended claims to a "tool" or to a "tool holder," such terms are used interchangeably, since it will be readily apparent that flange gripping portions or the like which are formed on a tool holder to cooperate with a gripper member, may, if desired, be formed directly on a tool which is to be transferred from one position to another.

Referring now to the drawing, there is shown a fragmentary portion of a tool storage member or matrix 10, which may for example comprise a large circular disc-shaped magazine having a plurality of circumferentially spaced sockets as at 12. The matrix 10 may be rotatable about a horizontal axis 14 for the purpose of positioning a selected one of the sockets 12 in a predetermined position for insertion or removal of a tool.

A tool holder 16 having a knob 18 projecting from its rear end is shown mounted in a socket 12 and held therein by a spring actuated latch member 20 which engages the knob 18 and locks the tool holder in position. A solenoid is represented at 22 for actuating the latch to release the tool holder. The latch mechanism 20 is fully described in the copending application of Harry R. Dziedzic and Edward M. Alisauskis, Ser. No. 197,745, filed May 25, 1962, now Patent No. 3,185,494, and assigned to the assignee of the present invention. It will be understood that a large number of tools may be stored in the matrix 10 for transfer to a work station or machine tool spindle as needed.

As stated hereinabove, the apparatus of the present invention is particularly adapted for use with tools or tool holders of the type having a generally radial flange means with a plurality of gripping surfaces thereon. Accordingly, the illustrated tool holder 16 is provided with an upper flange portion 24 and a lower flange portion 26. As will be described hereinafter, our tool transfer system includes tool transfer means and a transfer arm, each of which is provided with gripping means for cooperation with the flange portions on a tool holder in order to transport the tool holder, and in order to transfer a tool holder from the tool transfer means to the transfer arm and vice versa. Flanged tool holders of the type referred to herein are fully described in our above-mentioned copending application, Ser. No. 178,060.

Tool transfer means comprising a shuttle 28 is utilized to remove a selected tool holder 16 from the matrix 10 and transfer it to an intermediate tool transfer position from which it may be taken and transported to a work station. The shuttle 28 includes a carriage 30 which is provided with a plurality of rollers 32 whereby the shuttle is adapted to be driven back and forth along a rail or guide 34 by means of a chain drive or the like 36. The shuttle 28 is shown in dash lines in its extreme right hand position wherein it is adapted to cooperate with a selected tool in the matrix 10, and is shown in solid lines in its extreme left hand position wherein it is adapted to hold a selected tool in an intermediate tool transfer position.

The shuttle 28 is provided with gripping means 37 comprising gripper jaws 38 and 40. The gripper jaw 38 is pivotally mounted on a bracket 42 which is secured to the jaw 40, whereby the jaw 38 may be pivoted between closed and open positions for gripping and releasing a flange gripping area on a tool to be transferred. A compression spring 44 serves to bias the jaw 38 to its closed position, and a hydraulic cylinder assembly 46 including a piston rod 47 is adapted to effect the opening of the jaw.

A double acting cylinder 48 is provided for raising and lowering the shuttle gripper 37 when the shuttle 28 is in its extreme left hand position where a lug 50 on the gripping member is engaged by a hook 52 provided at the lower end of a piston which is reciprocable within the cylinder 48. Gripping member 37 is moved upwardly and downwardly within the shuttle in a guideway (not shown).

A transfer arm 54 is shown in its right hand position in solid lines and in its left hand position in dash lines, the arm being movable along its fixed axis 56 through a short stroke, and also being rotatable about the axis 56. The transfer arm 54 is provided with a gripper member at each of its ends, one such gripper member comprising jaws 58 and 60, and the other comprising jaws 62 and 64. An actuator 65 and compression spring 66 are shown for biasing the transfer arm jaws to closed positions, and tension spring 67 and 68 serve to open the jaws when a draw bar 69 which is connected to the actuator 65 is moved axially rearwardly by hydraulic or other suitable actuating means (not shown). The transfer arm and mechanism for rotating it and moving it axially are fully described in a copending application of Edward Hain, Ser. No. 206,938, filed July 2, 1962, now Patent No. 3,096,758, and assigned to the assignee of the present invention.

A spindle of a machine tool is indicated generally at 70, and collet means for holding a tool in the spindle is shown at 72, the collet means comprising a plurality of gripping fingers 74 adapted to engage the knob 18 upon movement of the fingers axially rearwardly by collet actuating means (not shown). An ejector rod 75 is axially movable with the fingers 74, whereby when the fingers are moved forwardly to release a tool holder 16, the rod 75 will butt the rear face of the knob 18 and aid in the removal of the tool from the spindle.

The operation of our tool changing system will now be described, and for this purpose it will be assumed that a tool 16 is in the spindle 70 and that it is desired to return this tool to the matrix 10 and to transport another tool from the matrix to the spindle for a further machining operation. It will also be assumed that the shuttle 28 is in its extreme right hand position with the shuttle jaws 38 and 40 open. Thus, the matrix 10 is indexed or rotated until a selected tool is positioned with its flange portion or flange gripping surface 24 disposed between the open shuttle jaws 38 and 40, and the matrix is then stopped. The foregoing operation may be controlled by automatic control means which do not form a part of the present invention, and thus will not be described herein.

Once the newly selected tool 16 is positioned with its flange portion 24 between the shuttle jaws 38 and 40, the hydraulic cylinder 46 is actuated so as to permit the spring 44 to close the jaws. The tool 16 is then released in the matrix by actuation of the solenoid 22, and thereafter the chain drive 36 is operated to move the shuttle 28 to its extreme left hand position so as to position the tool in the intermediate tool transfer position. It will be noted that in the embodiment being described the axis of the spindle 70 coincides with the matrix axis 14, and the shuttle 28 carries a newly selected tool 16 along an axis 76 which is parallel to the axis 14. It is also important to note that the transfer arm axis 56 is parallel to the spindle axis 14 and the axis 76 and is positioned midway therebetween.

During the movement of the shuttle 28 to the left to carry a newly selected tool to the intermediate tool transfer position, the transfer arm 54 will normally be in a neutral position, i.e., it will be in its right hand position and will be rotated 90 degrees from the position shown in the drawing so as to extend substantially horizontally. If desired, the neutral position may be other than horizontal, as long as it is rotated sufficiently from the position shown in the drawing to avoid interference with a tool which is being brought forward by the shuttle 28. It will thus be seen that a tool is selected from the matrix 10 and transferred to an intermediate tool transfer position from which it may be transported to the spindle 70 by the transfer arm 54, as will be described more fully hereinafter.

The foregoing operations thus far described may be performed while a tool in the spindle 70 is engaged in a machining operation, in which case the new tool may simply be held at the intermediate tool transfer position by the shuttle jaws 38 and 40 until the spindle 70 is stopped. If desired, the shuttle 28 may of course be stopped somewhat rearwardly of its extreme left hand position, and may wait there until the spindle is stopped, in which case upon stopping of the spindle the shuttle would be moved further to the left to locate the new tool in the intermediate tool transfer position.

If a tool or tool holder 16 is provided with a pair of distinct flange gripping surfaces such as at 24 and 26, rather than a continuous circumferential flange, then it is necessary to provide registering means for stopping the spindle 70 so that the flange portions on a tool mounted therein will be disposed vertically. Such registering means, however, forms no part of the present invention.

With the shuttle 28 in its left hand position with a newly selected tool gripped in its jaws, and with the spindle 70 stopped, the draw bar 69 is moved rearwardly so as to open the transfer arm jaws 58, 60, 62 and 64, and the transfer arm 54 is rotated from its neutral position to a vertical position whereby the jaws 58 and 60 will encompass the lowermost flange gripping portion 26 on the newly selected tool, and the jaws 62 and 64 will encompass the uppermost flange gripping portion on the tool which is disposed in the spindle 70, after which the draw bar 69 is moved to the left to close the transfer arm jaws. It will be noted that at this stage in the tool changing operation, the newly selected tool is being held at one flange gripping surface by the transfer arm jaws 58 and 60, and at another flange gripping surface by the shuttle jaws 38 and 40.

The cylinder 46 is then actuated to open the shuttle jaws, and thereafter the hydraulic cylinder 48 is actuated to raise the shuttle gripping member 37. It will be understood that the purpose of raising the shuttle gripper 37 is to move the latter away from the upper flange portion on the tool holder being gripped by the transfer arm jaws 58 and 60, so as to permit the transfer arm 54 to be moved axially to the left without interference with the shuttle jaws 38 and 40. Accordingly, it will be apparent that other shuttle gripper motions may be employed to accomplish the foregoing purpose. For example, the shuttle gripper 37 may be hingedly associated with the shuttle 28 an may thus be pivoted out of the position shown in the drawing to permit axial movement of the transfer arm 54 after receiving a tool from the shuttle gripper.

In addition, means such as the double acting cylinder 48 may, if desired, be provided adjacent the right hand position of the shuttle 28, for the purpose of maintaining the shuttle gripper 37 in a raised position when the matrix 10 is being rotated. However, it will be understood that such means is not essential, since with the shuttle in its operative position as shown in the drawing and with the shuttle jaws 38 and 40 open, the matrix can be rotated, since the flange gripping portions 24 on the various tools in the matrix will simply pass between the open shuttle jaws.

Continuing with the operation of the system, once the shuttle gripping member 37 has been moved upwardly away from a tool in the intermediate tool transfer position, the collet 72 is actuated to release the tool in the spindle 70, and the transfer arm 54 is moved axially to the left an amount sufficient to remove the old tool from the spindle, the ejector rod 75 aiding in the ejection of the old tool by being moved to the left to butt against the knob 18 thereon. The transfer arm 54 is then rotated 180 degrees and returned to its right hand position whereby the newly selected tool is inserted in the spindle 70, and thereafter the collet 72 is closed, the shuttle gripper 37 is lowered, and the cylinder 46 is operated to close the shuttle jaws 38 and 40 about the upper flange portion 24 on the tool which has been removed from the spindle.

Having thus inserted a new tool in the spindle 70 and removed the old tool therefrom, the draw bar 69 is moved axially to the right to open the transfer arm jaws 58, 60, 62 and 64, and the transfer arm 54 is rotated from its vertical position to a neutral position. The chain drive 36 is then operated to return the shuttle 28 to its right hand position so as to return the old tool to an empty socket 12 in the matrix 10, the tool being automatically locked therein by the latch 20. The cylinder 46 is next operated to open the shuttle jaws 38 and 40, after which the matrix may be indexed to search for the next tool to be transferred to the spindle.

It will be seen from the foregoing that the stated objects of the present invention have been accomplished. In particular, the tool storage means or matrix 10 may be located at any desired distance from the spindle 70, since in accordance with the invention tool transfer means such as the shuttle 28 serves to carry a selected tool from the matrix to the intermediate tool transfer position. In the embodiment described, the matrix 10 is positioned behind the spindle, and the shuttle is adapted to move forwardly from the matrix along a line parallel to the spindle axis 14. However, the matrix 10 may be disposed at other locations, such as in another room or on another floor of a building, in which case the shuttle travel must be modified accordingly, the essential objective being that the shuttle function to transport a newly selected tool from the matrix to the intermediate tool transfer position. In addition, while the matrix 10 is preferably rotatable as described hereinabove, it will be understood that a stationary matrix may be used, although the shuttle must then be adapted to move to the various tool positions in the matrix in order to remove a selected tool therefrom.

It will further be noted when a newly selected tool is gripped at one of its flange gripping portions by the shuttle gripper jaws 38 and 40 and held in the intermediate tool transfer position, the flange portions on the new tool are in alinement with the flange gripping portions on a tool in the spindle 70. Consequently, the transfer arm 54, which is mounted on a fixed axis 56 midway between the spindle axis 14 and the axis 76 of a tool in the intermediate position, need only be rotated to a vertical position in order to be adapted to grip at the same time both a flange gripping surface on the new tool and a flange gripping surface on a tool in the spindle. While in the preferred embodiment the transfer arm 54 is then moved axially to withdraw the old tool from the spindle 70, it will be understood that the spindle 70 may be withdrawn by being moved axially to the right away from the tool which was held therein, in which case axial shifting of the transfer arm is not necessary.

It should be understood that when the term "fixed axis" is used herein and in the appended claims with reference to the transfer arm axis 56, it is meant that the axis 56 is fixed relative to the axis of the spindle 70. In certain applications of the present invention the spindle and the transfer arm may move together in a transverse plane, as long as their axes remain fixed relative to one another.

If desired, a plurality of shuttles may be provided and may be stationed in respective left hand positions simultaneously, since as long as the transfer arm jaws are open, the arm 54 can be rotated through a number of tool positions and stopped at a tool to be selected.

While certain preferred forms of our invention have been described and illustrated, it will be appreciated that modifications and changes may be made therein by those skilled in the art, particularly with our disclosure before them, and thus we do not intend to be limited to the particular disclosure, except insofar as the appended claims are so limited.

We claim as our invention:

1. In automatic tool changing apparatus for handling tools of the type having a rigidly extending gripping flange in a machine tool having a spindle, the combination comprising, a transfer arm having oppositely extending gripping jaws adapted to lock on said tool flanges, said arm being mounted for rotation and axial sliding movement relative to and about an axis parallel to said spindle and spaced therefrom so as to grip, remove and rotate tools 180° from said spindle to an intermediate position wherein a tool is positioned parallel to and alined with a tool in the spindle, a rotatable tool magazine releasably carrying a plurality of said tools so as to bring any given one of the tools into a transfer position behind and axially alined with said intermediate position, and a transfer mechanism mounted for reciprocating linear movement between and adjacent said transfer and intermediate positions, said mechanism having gripping jaws adapted to lock on the flange of said tool so that said movement of the mechanism carries said tool from said magazine to said intermediate position where it is gripped by said transfer arm and exchanged with the tool then in said spindle.

2. In automatic tool changing apparatus for handling tools of the type having a rigidly extending gripping flange in a machine tool having a spindle, the combination comprising, a transfer arm having oppositely extending gripping jaws adapted to lock on said tool flanges, said arm being mounted for rotation and axial shifting movement relative to and about an axis parallel to said spindle and spaced therefrom so as to grip, remove and rotate tools 180° from said spindle to an intermediate position wherein a tool is positioned parallel to and alined with a tool in the spindle, a tool magazine releasably carrying a plurality of said tools and being positionable to bring any given one of the tools into a transfer position behind said intermediate position, and a transfer mechanism mounted for reciprocating movement between and adjacent said transfer and intermediate positions, said mechanism having gripping jaws adapted to lock on the flange of said tool so that said movement of the mechanism carries said tool from said magazine to said intermediate position where it is gripped by said transfer arm and exchanged with the tool then in said spindle.

3. An automatic tool changing apparatus for handling elongated tools of the type having a rigid transverse flange defining multiple gripping portions in a machine tool having a spindle to drive the tools and a magazine to store a plurality of the tools, the combination comprising, a first transfer member having gripping jaws adapted to lock on a gripping portion of one said tool flange by relative movement of the jaws in a direction generally parallel with the axis of the tool, a second transfer member having gripping jaws adapted to lock on another gripping portion of said tool flange by relative movement of the jaws in a direction generally parallel with the axis of the tool, said first and second transfer members being each mounted for movement to an intermediate transfer position whereat the jaws of both members can simultaneously grip the same tool thus allowing tool transfer utilizing said flange and without disturbing the axial alinement of the tool, means for moving said first transfer member in one direction relative said magazine, and means for moving said second transfer member in a second direction relative said spindle.

4. The combination of claim 3 in which one of said two directions is substantially radial with respect to a tool in said transfer position so as to minimize the required locking and unlocking movement of the jaws of said members.

No references cited.

RICHARD H. EANES, Jr., *Primary Examiner.*